United States Patent [19]
Koga et al.

[11] Patent Number: 5,670,830
[45] Date of Patent: Sep. 23, 1997

[54] FUEL USE LIMITER-EQUIPPED HYBRID ELECTRIC CAR

[75] Inventors: Hisamitsu Koga, Okazaki; Naotake Kumagai, Tokyo; Tomiji Ohwada; Nobuya Furukawa, both of Okazaki; Masaaki Kato, Kyoto; Nobuyuki Kawamura, Okazaki, all of Japan

[73] Assignee: Mitsubishi Jidosha Kogyo Kabushiki Kaisha, Tokyo, Japan

[21] Appl. No.: 431,289

[22] Filed: Apr. 28, 1995

[30]     Foreign Application Priority Data

Apr. 28, 1994   [JP]   Japan .................................. 6-091785

[51] Int. Cl.⁶ .................................................... F02B 73/00
[52] U.S. Cl. ................. 307/10.1; 180/65.2; 364/424.026
[58] Field of Search .......................... 307/9.1, 10.1; 318/139, 376, 581, 580; 180/65.1–65.8; 364/424.01, 424.03, 424.05, 424.1, 431.01, 423.098, 424.026, 424.034; 340/425.5, 438, 439, 450.2, 636; 290/49, 50

[56]     References Cited

U.S. PATENT DOCUMENTS

| | | | |
|---|---|---|---|
| 4,407,132 | 10/1983 | Kawakatsu et al. | 180/65.4 |
| 5,081,365 | 1/1992 | Field et al. | 290/50 |
| 5,367,455 | 11/1994 | Kitagawa et al. | 364/424.01 |
| 5,495,906 | 3/1996 | Furutani et al. | 180/65.4 |
| 5,534,759 | 7/1996 | Evans et al. | 180/65.1 |

*Primary Examiner*—William M. Shoop, Jr.
*Assistant Examiner*—Richard T. Elms

[57]     ABSTRACT

A fuel use limiter-equipped hybrid electric car has a battery unit chargeable by an external charger, an electric drive motor capable of driving wheels by electric power from the battery unit, an internal combustion engine for driving a generator to supply electric power to the electric drive motor, and a controller for controlling operations of the electric drive motor and internal combustion engine. The hybrid electric car is further provided with a fuel-use-state detector for detecting a change in a parameter, which change corresponds to a quantity of fuel used by the internal combustion engine since charging of the battery unit by the external charger. The controller limits at least one of an output of the electric drive motor and that of internal combustion engine when from results of a detection by the fuel-use-state detector, the change in the parameter is found to have reached a predetermined value.

28 Claims, 10 Drawing Sheets

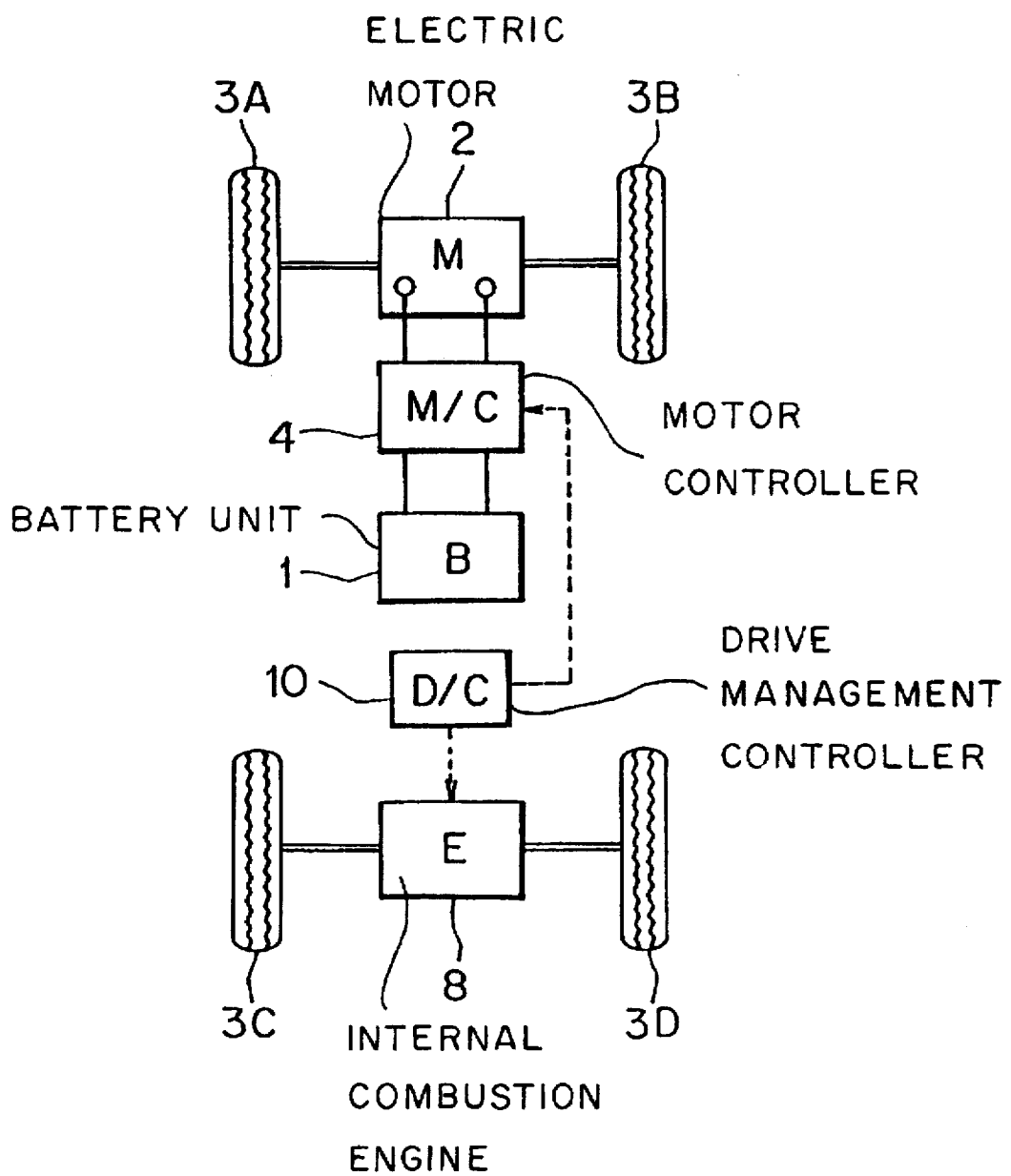
FIG. II
PRIOR ART

FUEL USE LIMITER-EQUIPPED HYBRID ELECTRIC CAR

BACKGROUND OF THE INVENTION a) Field of the Invention

This invention relates to a hybrid electric car of the type—for example, a series hybrid electric car equipped with an internal combustion engine for driving a generator to produce electric power for an electric drive motor, or a parallel hybrid electric car equipped with an internal combustion engine for directly driving wheels, equipped with a fuel use limiter in which reduction in the dependency on the internal combustion engine has been taken into consideration.

b) Description of the Related Art

There is an ever-increasing move toward protection of the global environment in recent years. In particular, the pollution of air due to mass consumption of fossil fuel has become a serious problem. Prevention of air pollution is therefore an extremely important theme for the protection of the global environment.

In cars, engines relying upon fossil fuel, such as gasoline or diesel oil, also make up a main stream presently. Air pollution by exhaust gas from cars has become an extremely serious problem especially in big cities, in particular, in their urban districts so that electric cars free of exhaust gas have been being given a second look.

At the present stage, however, these electric cars still involve various problems which still have to be worked out for their actual use. Electric cars have therefore not spread broadly to the public although they have been put into practical use in some fields. To make electric car more practical, a variety of techniques has thus been proposed to date.

For example, any attempt to increase the distance coverable by a presently-available electric car per charging inevitably requires mounting of a number of batteries thereon because the capacity of each battery is limited. Use of such many batteries however leads to a substantial increase in the vehicle weight and also occupation of a large space inside the vehicle, resulting in the inconvenience that the power performance and riding comfort of the vehicle are deteriorated. Use of fewer batteries definitely makes it impossible to increase the distance coverable per charging.

Further, an electric car has to be charged whenever the remaining capacity of its batteries as an energy source is decreased. Under the current situations, however, this battery charging is not so easy as replenishment of gasoline. If an electric car becomes no longer possible to run due to insufficient battery capacity and stops on the road, it is not easy to cope with this problem.

With a view to lessening the above-mentioned problem of such currently-available electric cars, electric cars equipped with an internal combustion engine mounted thereon, that is, so-called hybrid electric cars have been proposed.

These hybrid electric cars include so-called series hybrid electric cars and parallel hybrid electric cars.

For example, FIG. 10 is a schematic block diagram showing a series hybrid electric car. In FIG. 10, numeral 1 is a battery repeatedly chargeable by a generator 6, which is mounted on the car and is to be described subsequently herein, or an unillustrated external charger which is not mounted on the car. Designated at numeral 2 is a motor as an electric drive motor, to which electric power is supplied from the battery 1. Drive wheels 3A, 3B of the car are driven by the motor 2.

An output of the motor 2 is controlled by a motor controller 4 as electric drive motor control means on the basis of an output demand operation by a driver (namely, a stroke of an unillustrated accelerator pedal), the state of current operation of the motor 2, or the like. The motor controller 4, upon detection of a braking command from depression or the like of an unillustrated brake pedal, changes over the power source from the motor 2 to the generator 6 so that regenerative braking is performed. In other words, braking force is applied while generating electric power by using rotational energy from the drive wheels 3A, 3B.

The generator 6 is driven by a dynamo internal combustion engine 7 (hereinafter simply called the "engine"), and is connected to the battery 1 so that the battery 1 can be charged by electric power generated by the generator 6. Control of these generator 6 and engine 7 is performed, along with control of the motor controller 4, by a drive management controller 9.

On the other hand, FIG. 11 is a schematic block diagram illustrating a parallel hybrid electric car, in which the reference numerals already used in FIG. 10 indicate like members. Omitting description of these members, a description will therefore be made of only those specific to the parallel hybrid electric car. In FIG. 11, numeral 8 indicates a driving internal combustion engine, and this engine 8 is arranged to drive another pair of drive wheels 3C, 3D, which are different from the drive wheels 3A, 3B, in parallel with the motor 2.

Designated at numeral 10 is a management controller, which depending on the state of running of the car, controls the motor 2 and the engine 8 to actuate one of the motor 2 and the engine 8 or both the motor 2 and the engine 8 at an appropriate torque distribution ratio.

These hybrid electric cars can each increase its coverable distance by auxiliary operation of its internal combustion engine while obtaining such effects as reducing the exhaust gas and the air pollution.

In such conventional hybrid electric cars, their internal combustion engines are operated only as auxiliaries definitely. Normally, the hybrid electric cars are therefore supposed to be driven by operating only their electric drive motors, which do not emit exhaust gas, without operation of their internal combustion engines.

In the case of the series hybrid electric car, for example, it is desired, except for the event of emergency, to avoid running while operating the dynamo internal combustion engine, that is, while generating electric power (power-generating running). This can be achieved by externally charging the battery when the remaining capacity of the battery has decreased and before the car would become no longer possible to run.

With respect to the parallel hybrid electric car, it is also desired, during normal driving, to run by driving only the electric drive motor and to avoid operation of the driving internal combustion engine except for special situations like running in a special mode and a situation in which running of the car is by no means feasible without operation of the internal combustion engine due to lack of any means for performing external charging.

It is, however possible for each of these hybrid electric cars to run by its internal combustion engine. There is accordingly the potential problem that its driver may rely upon running by this internal combustion engine, because running by the internal combustion basis is still feasible. This however may render it impossible to achieve the inherent object of a hybrid electric car that the distance coverable by the car should be increased while effectively reducing the air pollution.

SUMMARY OF THE INVENTION

With the foregoing problems in view, the present invention has as a primary object thereof the provision of a fuel use limiter-equipped hybrid electric car which can lead a driver to running without relying upon an internal combustion engine.

In a first aspect of the present invention, there is thus provided a fuel use limiter-equipped hybrid electric car having a battery unit chargeable by external charging means, an electric drive motor capable of driving wheels by electric power from the battery unit, an internal combustion engine for driving a generator to supply electric power to the electric drive motor, and control means for controlling operations of the electric drive motor and the internal combustion engine, comprising:

fuel-use-state detection means for detecting a change in a parameter, the change corresponding to a quantity of fuel which has been used by the internal combustion engine since charging of the battery unit by the external charging means;

wherein the control means limits at least one of an output of the electric drive motor and that of the internal combustion engine when from results of a detection by the fuel-use-state detection means, the change in the parameter is found to have reached a predetermined value.

In the fuel use limiter-equipped hybrid electric car according to the first aspect of the present invention, electric power supplied from the battery unit under the control of the control means operates the electric drive motor to drive the wheels. Although this battery unit can be charged by the external charging means when its remaining capacity of this battery unit has dropped, the internal combustion engine is operated when the remaining capacity of the battery unit has dropped or so. While supplying a portion of the electric power, which has been produced by the generator, to the electric drive motor, the wheels can be driven by the remaining portion of the electric power.

However, when the fuel-use-state detection means detects a change in the parameter, the change corresponding to a quantity of fuel which has been used by the internal combustion engine since charging of the battery unit by the external charging means, and the change in the parameter is found to have reached a predetermined value, the control means limits at least one of an output of the electric drive motor and that of the internal engine. In other words, when running is continued without external charging while using fuel by the internal combustion engine, the output of the electric drive motor or that of the internal combustion engine is limited at the stage that the amount of used fuel has reached a certain level, whereby the driver is urged to perform external charging.

As a consequence, it is possible to promote running without relying upon the internal combustion despite the car is a hybrid electric car. It is therefore possible to fully achieve the effective prevention of air pollution, the inherent object of electric cars, while still allowing to run by the internal combustion engine in the event of emergency or the like.

The fuel use limiter-equipped hybrid electric car according to the first aspect of the present invention can include the following embodiments:

(a) In the first aspect, the quantity of supplied fuel is used as the parameter, the fuel-use-state detection means is supplied-fuel-quantity detection means for detecting a total quantity of fuel supplied after the charging of the battery unit by the external charging means, and the control means limits the output of the electric drive motor when from the results of the detection by the fuel-use-state detection means, the total quantity of supplied fuel is found to have reached a predetermined value.

(b) In the embodiment (a), the hybrid electric car is provided with fuel quantity detection means for detecting a quantity of fuel in a fuel tank, and the supplied-fuel-quantity detection means detects the total quantity of the supplied fuel on the basis of detection information from the fuel quantity detection means.

(c) In the embodiment (a), the supplied-fuel-quantity detection means calculates the total quantity of the supplied fuel by using, as an initial value of the total quantity of supplied fuel, a quantity of fuel immediately after charging of the battery unit by the external charging means and then adding a quantity of fuel supplied at each fuel filling.

(d) In the embodiment (b), the supplied-fuel-quantity detection means calculates the total quantity of the supplied fuel by using, as an initial value of the total quantity of supplied fuel, a quantity of fuel immediately after charging of the battery unit by the external charging means and then adding a quantity of fuel supplied at each fuel filling.

(e) In the embodiment (b), the hybrid electric car is provided with filler cap open/close detection means for detecting an open or closed state of a filler cap and means for detecting the quantity of fuel in the fuel tank, and the suppled-fuel-quantity detection means calculates the quantity of fuel supplied at each fuel filling from a quantity of fuel in the fuel tank detected upon opening of the filler cap and another quantity of fuel in the fuel tank detected upon subsequent closure of the filler cap on the basis of detection information from the filler cap open/close detection means and that from the fuel quantity detection means.

(f) In the embodiment (c), the hybrid electric car is provided with filler cap open/close detection means for detecting an open or closed state of a filler cap and means for detecting the quantity of fuel in the fuel tank, and the suppled-fuel-quantity detection means calculates the quantity of fuel supplied at each fuel filling from a quantity of fuel in the fuel tank detected upon opening of the filler cap and another quantity of fuel in the fuel tank detected upon subsequent closure of the filler cap on the basis of detection information from the filler cap open/close detection means and that from the fuel quantity detection means.

(g) In the embodiment (d), the hybrid electric car is provided with filler cap open/close detection means for detecting an open or closed state of a filler cap and means for detecting the quantity of fuel in the fuel tank, and the supplied-fuel-quantity detection means calculates the quantity of fuel supplied at each fuel filling from a quantity of fuel in the fuel tank detected upon opening of the filler cap and another quantity of fuel in the fuel tank detected upon subsequent closure of the filler cap on the basis of detection information from said filler cap open/close detection means and that from the fuel quantity detection means.

(h) In the embodiment (b), the hybrid electric car is provided with means for detecting a trouble of a path through which detection results are transmitted from the fuel detection means to the supplied-fuel-quantity detection means, and the control means limits an output of the electric drive motor upon detection of a trouble by the trouble detection means irrespective of results of a detection by the supplied-fuel-quantity detection means.

(i) In the first aspect, the hybrid electric car is provided with means for detecting a quantity of fuel in the fuel tank, the quantity of fuel in the fuel tank is used as the parameter, the fuel-use-state detection means comprises consumed-fuel-quantity detection means for detecting on the basis of detection information from the fuel quantity detection means a total quantity of fuel consumed after charging of the battery unit by the external charging means, and the control means limits an output of the electric drive motor when from results of a detection by the consumed-fuel-quantity detection means, the total quantity of consumed fuel is found to have reached a predetermined value.

(j) In the embodiment (i), the consumed-fuel-quantity detection means calculates the total quantity of consumed fuel by subtracting a quantity of fuel after each running of the car from a quantity of fuel before the running to determine the quantity of fuel consumed during the running and summing quantities of fuel consumed during individual runnings.

(k) In the embodiment (i), the hybrid electric car is provided with means for detecting a trouble of a path through which detection results are transmitted from the fuel detection means to the supplied-fuel-quantity detection means, and the control means limits an output of the electric drive motor upon detection of a trouble by the trouble detection means irrespective of results of a detection by the supplied-fuel-quantity detection means.

(l) In the embodiment (j), the hybrid electric car is provided with means for detecting a trouble of a path through which detection results are transmitted from the fuel detection means to the supplied-fuel-quantity detection means, and the control means limits an output of the electric drive motor upon detection of a trouble by the trouble detection means irrespective of results of a detection by the supplied-fuel-quantity detection means.

(m) In the first aspect, a travelled distance of the car while using the internal combustion engine is used as the parameter, the fuel-use-state detection means comprises travelled distance detection means for detecting a total distance travelled during the use of the internal combustion engine after charging of the battery unit by the external charging means, and the control means limits an output of the electric drive motor when, from results of a detection by the travelled distance detection means, the total distance travelled during the use of the internal combustion engine is found to have reached a predetermined value.

(n) In the embodiment (m), the travelled distance detection means detects the total travelled distance during the use of the internal combustion engine on the basis of information on use of the internal combustion engine and detection information from wheel speed detection means which the car is equipped with.

(o) In the embodiment (n), the hybrid electric car is provided with means for detecting a trouble of a path through which detection results are transmitted from the wheel speed detection means to the travelled distance detection means, and the control means limits an output of the electric drive motor upon detection of a trouble by the trouble detection means irrespective of results of a detection by the wheel speed detection means.

(p) In first aspect, a travelled distance of the car while using the internal combustion engine is used as the parameter, the fuel-use-state detection means comprises travelled distance detection means for detecting a total distance travelled during the use of the internal combustion engine after charging of the battery unit by the external charging means, and the control means limits an output of the electric drive motor when from results of a detection by the travelled distance detection means, the total distance travelled during the use of the internal combustion engine is found to have reached a predetermined value or when, from results of a detection by said travelled distance detection means, the total distance travelled during the use of the internal combustion engine is found to have reached another predetermined value.

(q) In the embodiment (p), the hybrid electric car is provided with means for detecting a trouble of a path through which detection results are transmitted from the fuel detection means to the supplied-fuel-quantity detection means, and the control means limits an output of the electric drive motor upon detection of a trouble by the trouble detection means irrespective of results of a detection by the supplied-fuel-quantity detection means.

(r) In the embodiment (p), the hybrid electric car is provided with means for detecting a trouble of a path through which detection results are transmitted from the wheel speed detection means to the travelled distance detection means, and the control means limits an output of the electric drive motor upon detection of a trouble by the trouble detection means irrespective of results of a detection by the wheel speed detection means.

(s) In the first aspect, an operation time of the internal combustion engine is used as the parameter, the fuel-use-state detection means comprises operation time detection means for detecting an operation time of the internal combustion engine after charging of the battery unit by the external charging means, and the control means limits an output of the electric drive motor when from results of a detection by the operation time detection means, the operation time of the internal combustion engine is found to have reached a predetermined value.

(t) In the embodiment (s), the operation time detection means detects the operation time of the internal combustion engine by a timer on the basis of information on use of the internal combustion engine.

(u) In the first aspect, the hybrid electric car is provided with warning means which is actuated when from results of a detection by the fuel-use-state detection means, the change in the parameter is found to have reached a predetermined value.

(v) In the embodiment (u), the predetermined value of the change of the parameter, at which predetermined value the warning means is actuated, is set smaller than another predetermined value of the change of the parameter at the another predetermined value the output of the electric drive motor is limited.

(w) In the first aspect, the control means limits the output of the electric drive motor when the change in the parameter has reached the predetermined value.

(x) In the embodiment (w), the control means limits the output of the electric drive motor by limiting a maximum torque of the electric drive motor.

(y) In the embodiment (w), the control means limits the output of the electric drive motor by gradually reducing a torque of the electric drive motor when a rotational speed of the electric drive motor has reached a predetermined value.

(z) In the embodiment (w), the control means operates the internal combustion engine in an operation region in which gas mileage and exhaust gas are optimal.

In a second aspect of the present invention, there is also provided a fuel use limiter-equipped hybrid electric car having a battery unit chargeable by external charging means, an electric drive motor capable of driving wheels by electric power from the battery unit, an internal combustion engine capable of driving the drive wheels, and control means for controlling operations of said electric drive motor and said internal combustion engine, comprising:

fuel-use-state detection means for detecting a change in a parameter, the change corresponding to a quantity of fuel which has been used by the internal combustion engine since charging of the battery unit by the external charging means;

wherein the control means limits an output of the internal combustion engine when from results of a detection by said fuel-use-state detection means, the change in the parameter is found to have reached a predetermined value.

In the fuel use limiter-equipped hybrid electric car according to the second aspect of the present invention, electric power supplied from the battery unit under the control of the control means operates the electric drive motor to drive the wheels. Although this battery unit can be charged by the external charging means when its remaining capacity of this battery unit has dropped, the internal combustion engine is operated when the remaining capacity of the battery unit has dropped or so. The drive wheels can, therefore, be driven directly by the internal combustion engine.

However, when the fuel-use-state detection means detects a change in the parameter, the change corresponding to a quantity of fuel which has been used by the internal combustion engine since charging of the battery unit by the external charging means, and the change in the parameter is found to have reached a predetermined value, the control means limits an output of the internal engine. In other words, when running is continued without external charging while using fuel by the internal combustion engine, the output of the internal combustion engine is limited at the stage that the amount of used fuel has reached a certain level, whereby the driver is urged to perform external charging.

As a consequence, it is possible to promote running without relying upon the internal combustion despite the car is a hybrid electric car. It is therefore possible to fully achieve the effective prevention of air pollution, the inherent object of electric cars, while still allowing to run by the internal combustion engine in the event of emergency or the like.

BRIEF DESCRIPTION OF THE DRAWINGS

FIG. 11 is a schematic block diagram of a parallel hybrid electric car.

DESCRIPTION OF THE PREFERRED EMBODIMENTS

Figure 1:
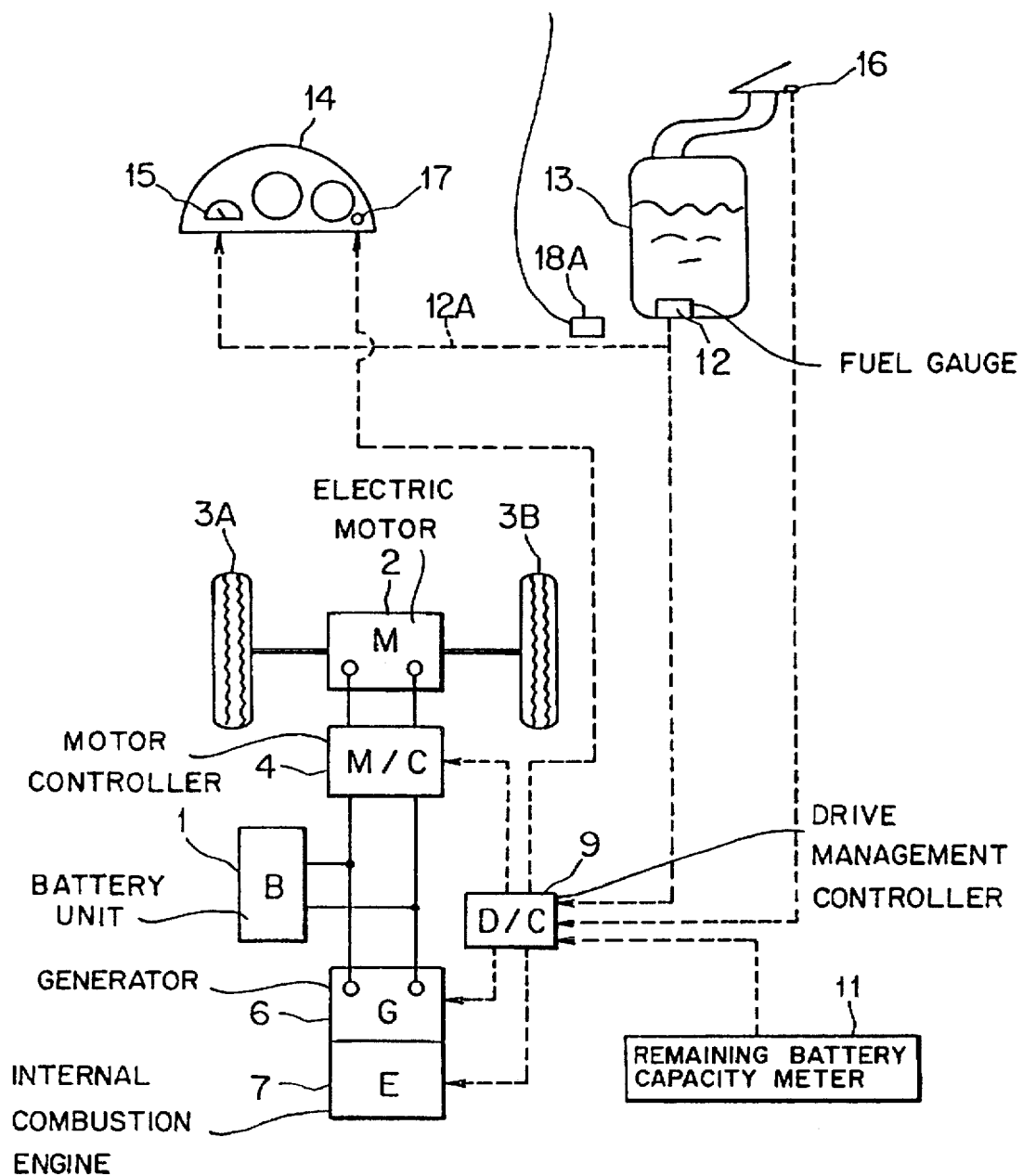
FIG. 1 is a simplified block diagram showing an essential construction of a fuel use limiter-equipped hybrid electric car according to a first embodiment of the present invention.

Referring first to FIGS. 1 through 4, the fuel use limiter-equipped hybrid electric car according to the first embodiment of the present invention will hereinafter be described. FIG. 1 schematically illustrates the construction of its essential part. In this embodiment, the present invention has been applied to a series hybrid electric car.

In FIG. 1, numeral 1 indicates a battery unit. This battery unit 1 can be repeatedly charged not only by a generator 6, which is mounted on the car and will be described subsequently herein, but also by an external charger (not illustrated) which the car is not equipped with.

Designated at numeral 2 is a motor (electric drive motor) to which electric power is supplied from the battery unit 1. Drive wheels 3A, 3B of the car are driven by the motor 2. An output of the motor 2 is controlled by a motor controller (electric drive motor control means) 4. The motor controller 4 controls the output of the motor 2 on the basis of an output demand operation by a driver (namely, a stroke of an unillustrated accelerator pedal), the state of current operation of the motor 2, or the like.

The motor controller 4, upon detection of a braking command from depression or the like of an unillustrated brake pedal, changes over the power source from the motor 2 to the generator 6 so that regenerative braking is performed, in other words, braking force is applied while generating electric power by using rotational energy from the drive wheels 3A, 3B.

The generator 6 is driven by a dynamo internal combustion engine 7 (hereinafter simply called the "engine"), and is connected to the battery unit 1 so that the battery unit 1 can be charged by electric power generated by the generator 6. The engine is controlled in output by adjusting a throttle opening or the like (not illustrated). Further, these generator 6 and engine 7 are also controlled by a drive management controller 9 in combination with control by the motor controller 4.

Designated at numeral 11 is a remaining capacity meter which detects and indicates the remaining capacity of the battery unit 1. Information on the remaining capacity of the battery unit 1 is fed from the remaining capacity meter 11 to the drive management controller 9.

Further, numeral 12 indicates a fuel gauge which constitutes fuel-use-state detection means. This fuel gauge 12 is arranged in a fuel tank 13. A detection signal indicating the quantity of fuel within the fuel tank 13 as detected by the fuel gauge 12 is fed to a fuel meter 15 in a combination meter panel 14 and also to the drive management controller 9. The fuel meter 15 displays the quantity of fuel on the basis of the fuel quantity detection signal.

Numeral 16 indicates a filler cap open/close sensor. This filler cap open/close sensor 16 has a button switch or the like which, for example, is pressed upon closing but is released upon opening. Each open/close detection signal from this filler cap open/close sensor 16 is also sent to the drive management controller 9.

The drive management controller 9 generally performs control of the motor controller 4, the generator 6 and the engine 7 on the basis of information on a driver's command such as an accelerator pedal stroke and also remaining battery unit capacity information from the remaining capacity meter 11. In addition, based on detection information from the remaining capacity meter 11, the fuel gauge 12 and the filler cap open/close sensor 16, the drive management controller 9 calculates the total quantity of fuel which has been supplied since the battery unit was externally charged. When this total quantity of supplied fuel has exceeded a predetermined value set in advance, the drive management controller 9 limits an output of the electric drive motor 2.

Described specifically, upon detection of opening of a filler cap on the basis of detection information from the filler cap open/close sensor 16, the drive management controller 9 stores a first fuel quantity LO which has been obtained from the fuel gauge 12 at this time. Upon detection of subsequent closure of the filler cap, the drive management controller 9 also stores a second fuel quantity LC which has been obtained from the fuel gauge 12 at this time. Based on these fuel quantities LO,LC, an increment in fuel quantity (=LC−LO) from the opening of the filler cap until the closure of the filler cap, in other words, the quantity of supplied fuel is calculated.

Upon each filling (in practice, whenever the filler cap is opened and then closed), the quantity of supplied fuel (=LC−LO) is calculated and is then added to the calculated value of the quantity of fuel supplied until completion of the preceding filling of fuel. The value of this total quantity of supplied fuel is reset when the battery unit is externally charged. In this embodiment, when the battery unit is externally charged, the total quantity of fuel at that time is stored as an initial value of the total quantity of supplied fuel. Accordingly, the term "the value of the total quantity of supplied fuel" as used herein is the sum of the total quantity itself of supplied fuel and the quantity of fuel remaining in the fuel tank after each filling and can also be called the "quantity of consumable fuel".

Whether the battery unit has been externally charged or not is determined based on information on the remaining battery unit capacity from the remaining capacity meter 11. The battery unit is determined to have been subjected to external charging when the value of its remaining capacity has reached a predetermined charged rate. In general, this predetermined charged rate is significantly higher compared with a range of charged rates achieved during power-generating running. It is therefore possible to distinguish external charging and internal charging (i.e., charging by the generator mounted on the car).

When the value of the total quantity of fuel supplied since the external charging of the battery unit, as calculated above, has exceeded a predetermined value, the drive management controller 9 limits an output of the electric drive motor 2. When the battery unit is externally charged again, the drive management controller 9 cancels the limitation of the output. In addition, when the total quantity of supplied fuel has exceeded the predetermined value, the drive management controller 9 also turns on an alarm lamp 17 to indicate an oversupply of fuel. This limitation of the output of the electric drive motor 2 is set at such a level that, although the driver fully perceives an insufficient output of the car, the driver can barely reach a place where external charging can be performed.

Figure 2:
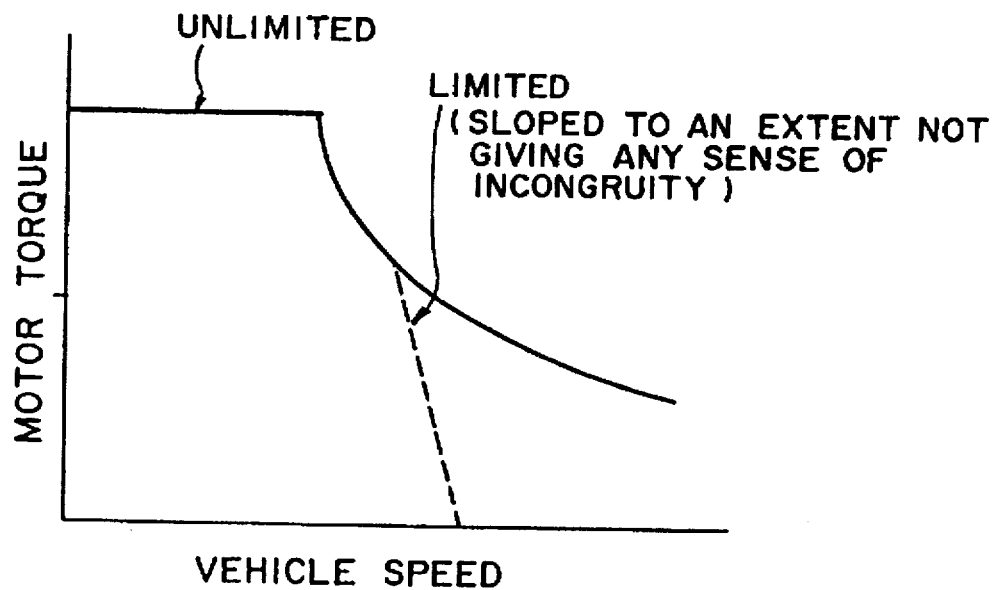
FIG. 2 is a diagram illustrating a specific example of output limiting characteristics of the fuel use limiter-equipped hybrid electric car according to the first embodiment of the present invention.
Figure 3:
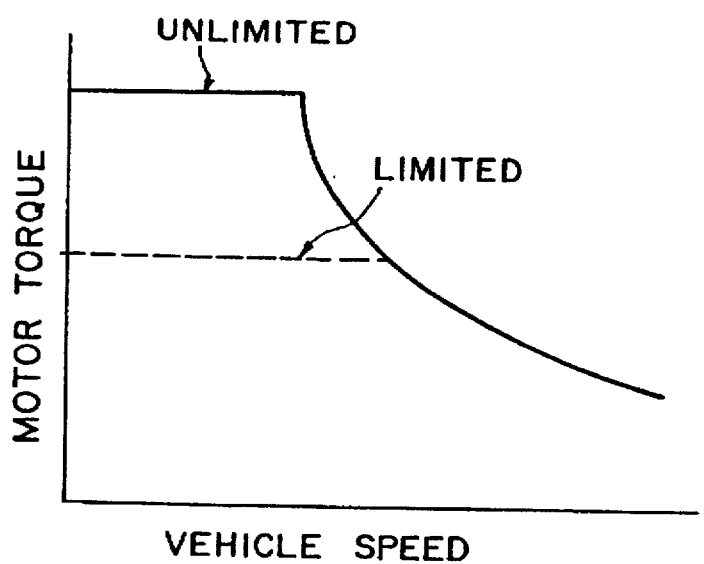
FIG. 3 is a diagram illustrating another specific example of the output limiting characteristics of the fuel use limiter-equipped hybrid electric car according to the first embodiment of the present invention.

Here, specific examples of the limitation of the output of the electric drive motor 2 will be described with reference to FIGS. 2 and 3. In each of these diagrams, a solid line indicates performance characteristics when the output of the electric drive motor 2 is unlimited, while a broken line indicates performance characteristics when the output of the electric drive motor 2 is limited. According to the limitation shown in FIG. 2, the torque of the electric drive motor 2 is gradually reduced in a range where the vehicle speed (or the rotational speed of the electric drive motor 2) is equal to and higher than a predetermined value. When the vehicle speed (or the rotational speed of the electric drive motor 2) is lower than the predetermined value, no torque limitation is therefore performed so that desired drive power can be obtained while driving uphill or upon making a start. When the vehicle speed (or the rotational speed of the electric drive motor 2) is equal to or higher than the predetermined value, on the other hand, the torque is limited. Owing to this torque limitation, the driver perceives an insufficient output from the car so that the driver is urged to perform external charging. According to the limitation depicted in FIG. 3, a limitation is imposed on the maximum torque irrespective of the rotational speed of the electric drive motor. By making the driver perceive insufficiency in the maximum torque of the car, the driver is urged to perform external charging. Although the limitation can be practiced in either way, the output limitation method shown in FIG. 2 is preferred from the practical standpoint which has taken into consideration the performance while driving uphill or upon making a start.

The fuel use limiter-equipped hybrid electric car according to the first embodiment of the present invention is also provided with wire breaking detection means 18A which detects any breaking of a signal line 12A from the fuel gauge 12. When breaking of the signal line 12A is determined based on detection information from the wire breaking detection means 18A, the drive management controller 9 limits the output of the electric drive motor 2 irrespective of the value of the total quantity of supplied fuel. When the signal line 12A is restored (i.e., connected) again by repair or the like, the drive management controller 9 then cancel the limitation of the output of the electric drive motor 2.

Figure 4:
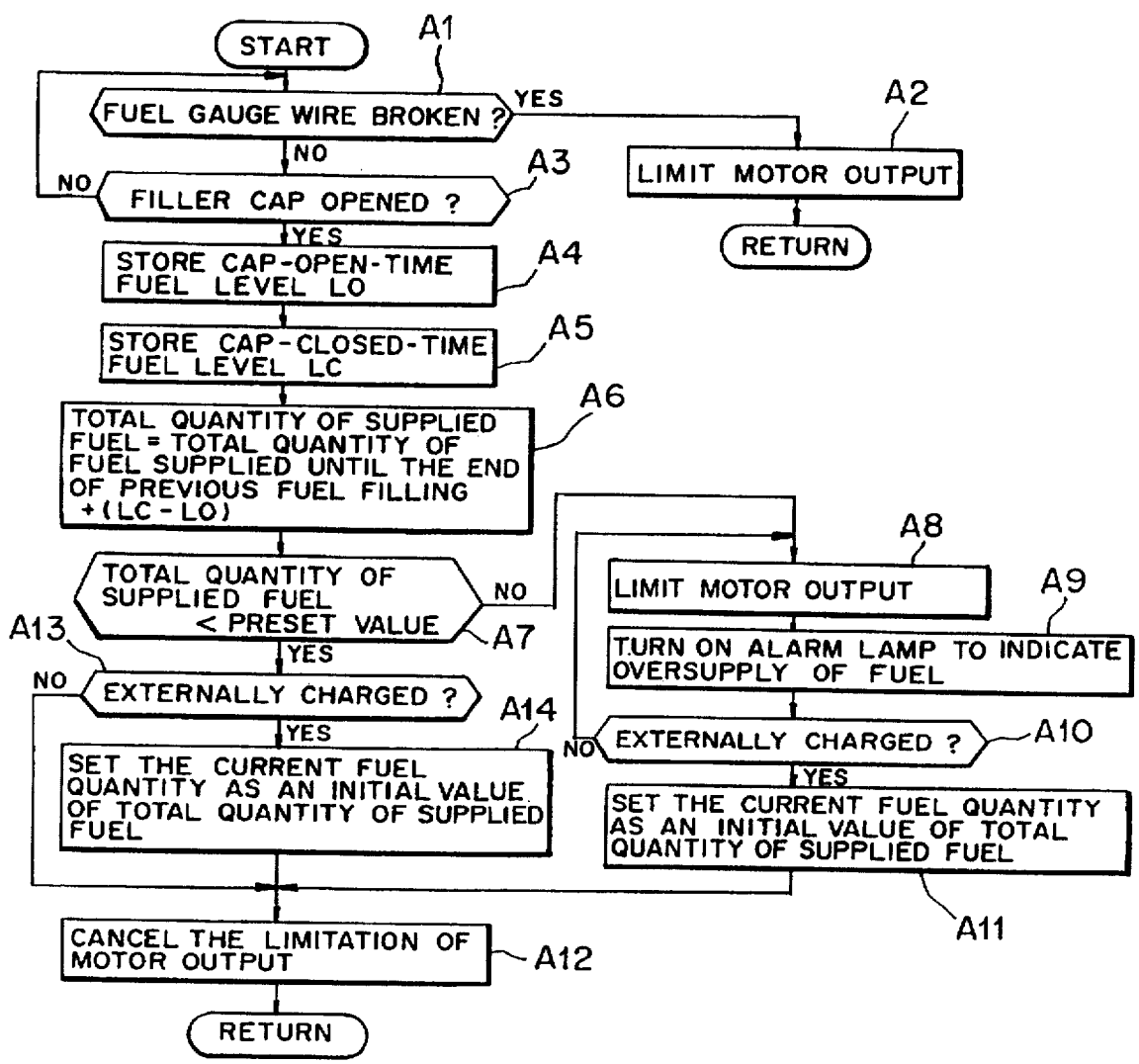
FIG. 4 is a flow chart illustrating an operation of the fuel use limiter-equipped hybrid electric car according to the first embodiment of the present invention.

In the fuel use limiter-equipped hybrid electric car according to the first embodiment of the present invention, control is performed for the limitation of use of fuel, for example, as shown in FIG. 4 owing to the above-described construction.

Namely, based on information from the wire breaking detection means 18A, the drive management controller 9 first determines whether breaking of the signal line 12A of the fuel gauge 12 (fuel wire gauge breaking) has been detected or not (step A1). If breaking of the fuel gauge wire is detected, an output of the electric drive motor 2 is limited (step A2).

If breaking of the fuel gauge wire is not detected on the other hand, it is determined based on information of the filler cap open/close sensor 16 whether the filler cap has been closed or not (step A3). If opening of the filler cap is detected, the total quantity of supplied fuel is calculated. Namely, a first fuel quantity LO obtained from the fuel gauge 12 when the filler cap is open is stored (step A4). Next, a second fuel quantity LC obtained from the fuel gauge 12 when the filler cap has been closed is stored (step A5). Based on these fuel quantities LO,LC, the increment in fuel quantity (=LC−LO) from the opening of the filler cap until its closure is added to a calculated value of the quantity of supplied fuel until the previous filling (i.e., the total quantity of fuel supplied until completion of the preceding filling of the fuel), whereby the total quantity of supplied fuel is calculated (step A6).

Further, it is determined whether or not this total quantity of supplied fuel has reached a preset value determined in advance (step A7). If the total quantity of supplied fuel is determined to have reached the preset value, an output of the electric drive motor 2 is limited (step A8) and the alarm lamp 17 is turned on to indicate an oversupply of fuel (step A9).

Based on information on the remaining capacity of the battery unit from the remaining capacity mater 11, it is next determined whether or not the battery unit has been externally charged (step A10). If the battery unit is not determined to have been subjected to external charging, the limitation of the output of the electric drive motor 2 (step A8) and the lighting of the alarm lamp 17 (step A9) are continued. If the battery unit is determined to have been externally charged, the value of the total quantity of supplied fuel is reset (step A11). Namely, the quantity of fuel at the time point that the external charging of the battery unit has been determined is set as an initial value of the total quantity of supplied fuel. Further, the limitation of the output of the electric drive motor 2 is canceled in step A12.

Additionally, the alarm lamp 17 is turned off in step A12 if the alarm lamp 17 is lit.

If the total quantity of supplied fuel is not determined to have reached the preset value, on the other hand, the routine then advances to step A13 without limiting the output of the electric drive motor 2. Based on information on the remaining capacity of the battery unit from the remaining capacity meter 11, it is determined whether the battery unit has been subjected to external charging or not. If external charging is determined to have been applied to the battery unit, the value of the total quantity of supplied fuel is reset (step A14). Namely, the quantity of fuel at the time point that the external charging of the battery unit has been determined is set as an initial value of the total quantity of supplied fuel, and the routine then advances to step A12. If the battery unit is not determined in step A13 to have been externally charged, the routine advances directly to step A12 without going through step A14. Consequently, whichever the case may be (namely, whichever route is taken from step A13), the routine advances to step A12 so that the limitation of the output of the electric drive motor 2 is canceled.

Where the routine has advanced through the route of step A13 and step A14, no output limitation has been performed in general. In this case, step A12 is not needed. Where breaking of the fuel gauge wire has been restored, an output limitation may, however, be performed even when the routine advances through step A13 and step A14. In this case, the limitation of the output of the electric drive motor 2 is canceled.

If the quantity of supplied fuel (strictly speaking, the quantity of consumable fuel) increases without external charging as described above, a limitation is imposed on the output of the electric drive motor 2. The driver therefore perceives an insufficient output of the car so that the driver is urged to perform external charging. Further, the lighting of the alarm lamp 17, which indicates an oversupply of fuel, gives a warning to the driver so that the driver can recognize this reduction in the output as being attributed to the oversupply of fuel instead of any trouble.

Since the driver cannot freely drive the car when the output is lowered as described above, the driver is motivated to always maintain the capacity of the battery unit at a sufficient level by external charging. Although the electric vehicle is a hybrid electric car, the driver can drive the car without relying upon the internal combustion engine.

As a result, it is possible to fully obtain the air pollution preventing effect, which is the inherent object of the electric car, while still allowing the car to run by the internal combustion engine in the event of emergency or the like.

Here, a description will be made of a modification of the first embodiment. This modification is basically similar to the first embodiment except that the timing of lighting of the alarm lamp 17 is different. In the first embodiment, the output limitation of the electric drive motor 2 and the lighting of the alarm lamp 17 are performed at the same time when the total quantity of supplied fuel has exceeded the preset value. However, this modification is constructed so that the alarm lamp is turned on when the total quantity of supplied fuel has exceeded a first preset value and the output of the electric drive motor 2 is subsequently limited when the total quantity of supplied fuel has exceeded a second preset value set at a value greater than the first preset value.

Figure 5:
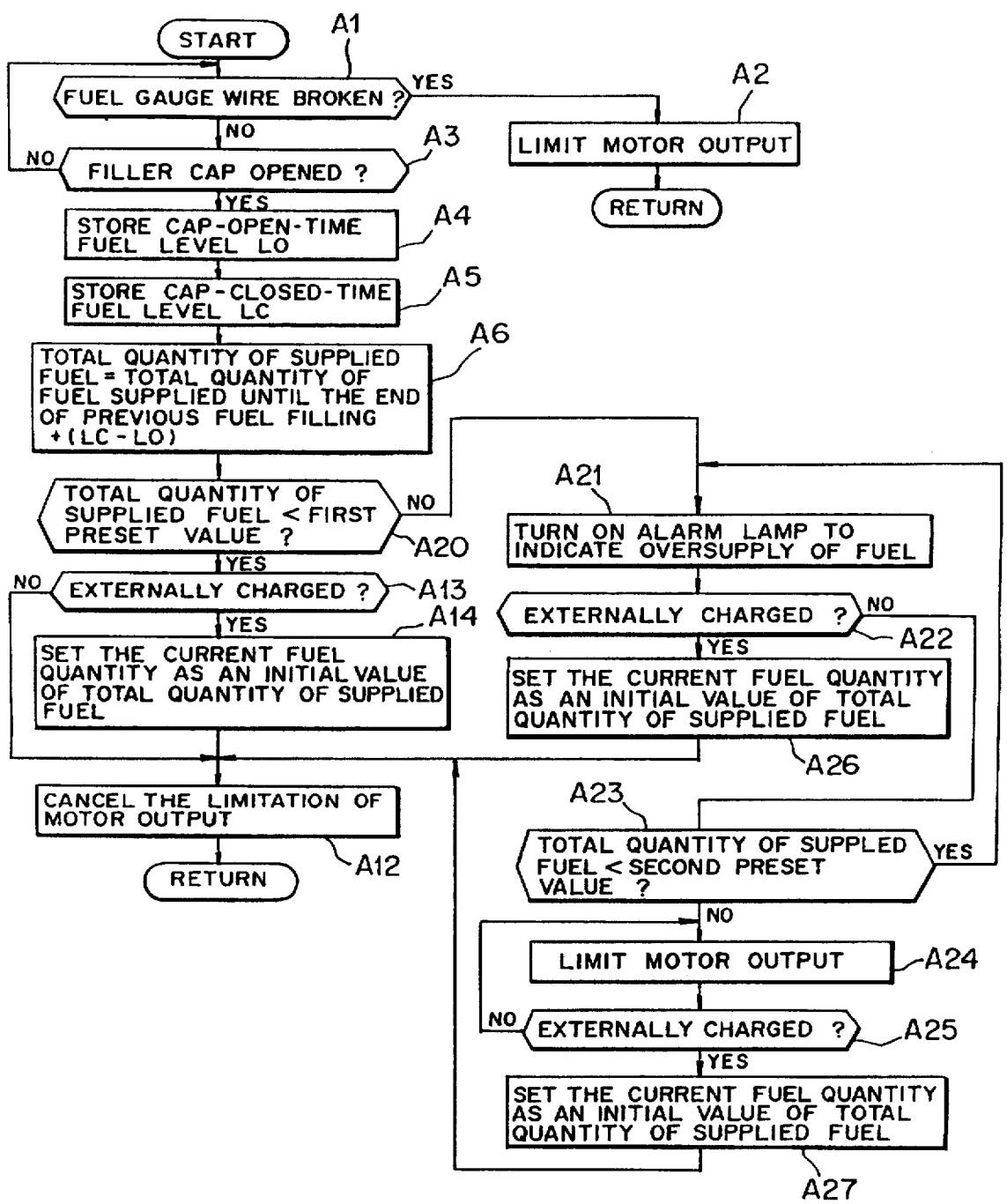
FIG. 5 is a flow chart illustrating an operation of a modification of the fuel use limiter-equipped hybrid electric car according to the first embodiment of the present invention.

A specific example of control for the limitation of use of fuel will next be described with reference to FIG. 5.

Steps A1–A6 are exactly the same as steps A1–A6 in the first embodiment. When the total quantity of supplied fuel has been calculated in step A6, it is next determined whether or not this total quantity of supplied fuel has reached a preset first value determined in advance (step A20). If the total quantity of supplied fuel is determined to have reached the first preset value, the alarm lamp 17 is turned on (step A21). Based on information on the remaining capacity of the battery unit from the remaining capacity meter 11, it is next determined whether or not the battery unit has been externally charged (step A22). If the battery unit is not determined to have been subjected to external charging, it is determined whether the total quantity of supplied fuel has reached the second preset value determined beforehand at the value greater than the first set value (step A23). If the total quantity of supplied fuel is determined to have reached the second preset value, an output limitation of the electric drive motor 2 is performed (step A24).

Based on information on the remaining capacity of the battery unit from the remaining capacity meter 11, it is next determined whether the battery unit has been subjected to external charging (step A25). If the battery unit is not determined to have been externally charged, the lighting of the alarm lamp 17 and the output limitation of the electric drive motor 2 are continued.

The foregoing are the details of control to be performed when a driver continues to drive the car without external charging.

If external charging is performed before the total quantity of supplied fuel reaches the first preset value, on the other hand, the value of the total quantity of supplied fuel is reset (step A14). Namely, the quantity of fuel at the time point that external charging has been determined is set as an initial value of the total quantity of supplied fuel.

When external charging is performed while the alarm lamp 17 is being lit to indicate an oversupply of fuel, in other words, while the total quantity of fuel supplied without external charging is between the first preset value and the second preset value, the value of the total quantity of supplied fuel is also reset (step A26). When external charging is performed while the alarm lamp 17 is being lit and the output of the electric drive motor 2 is limited, in other words, when the total quantity of fuel supplied without external charging has exceeded the second preset value, the value of the total quantity of supplied fuel is also reset (step A27). In each of these steps A14, A26 and A27, it is no longer necessary to perform external charging and hence to limit the output of the electric drive motor 2, the output limitation of the electric drive motor 2 is canceled or the alarm lamp 17 is turned off (step A12).

Where the routine has advanced through the route of step A13 and step A14, no output limitation has been performed in general. In this case, step A12 is not needed. Where breaking of the fuel gauge wire has been restored, an output limitation may, however, be performed even when the routine advances through step A13 and step A14. In this case, the limitation of the output of the electric drive motor 2 is canceled.

If the quantity of supplied fuel, namely, the quantity of consumable fuel increases without external charging, a limitation is eventually imposed on the output of the electric drive motor 2 as in the first embodiment described above. The driver, therefore, perceives an insufficient output of the car so that the driver is urged to perform external charging. In this modification, it is to be noted especially that the alarm lamp 17 is turned on at a stage before the output limitation of the electric drive motor 2 is performed. The driver can, therefore, learn that the output will be limited eventually if he continues to drive the car further without external charging. This makes it possible to perform external charging before the output limitation is performed.

Further, the output of the electric drive motor 2 is also limited when the signal line is broken. Even if any overuse of the internal combustion cannot be detected during wire breaking, it is therefore possible to warn the overuse of the internal combustion engine and to urge restoration (connection) of the wire. Of course, it is possible to fully obtain the air pollution preventing effect, which is the inherent object of the electric car.

Figure 6:
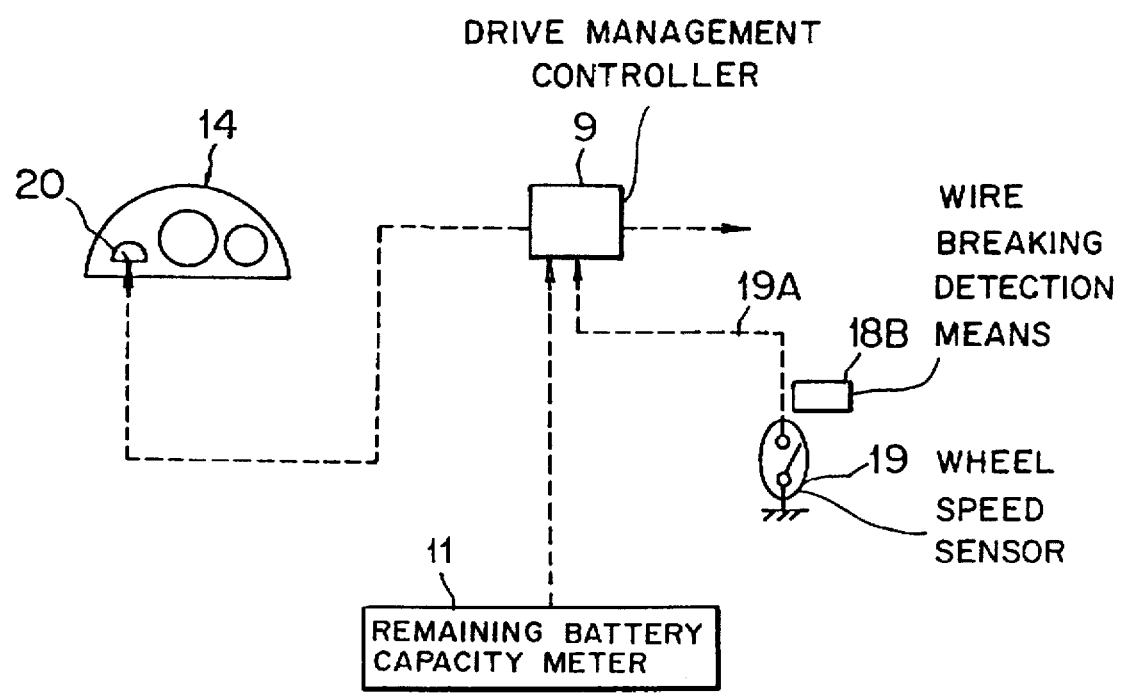
FIG. 6 is a simplified block diagram showing an essential construction of a fuel use limiter-equipped hybrid electric car according to a second embodiment of the present invention.
Figure 7:
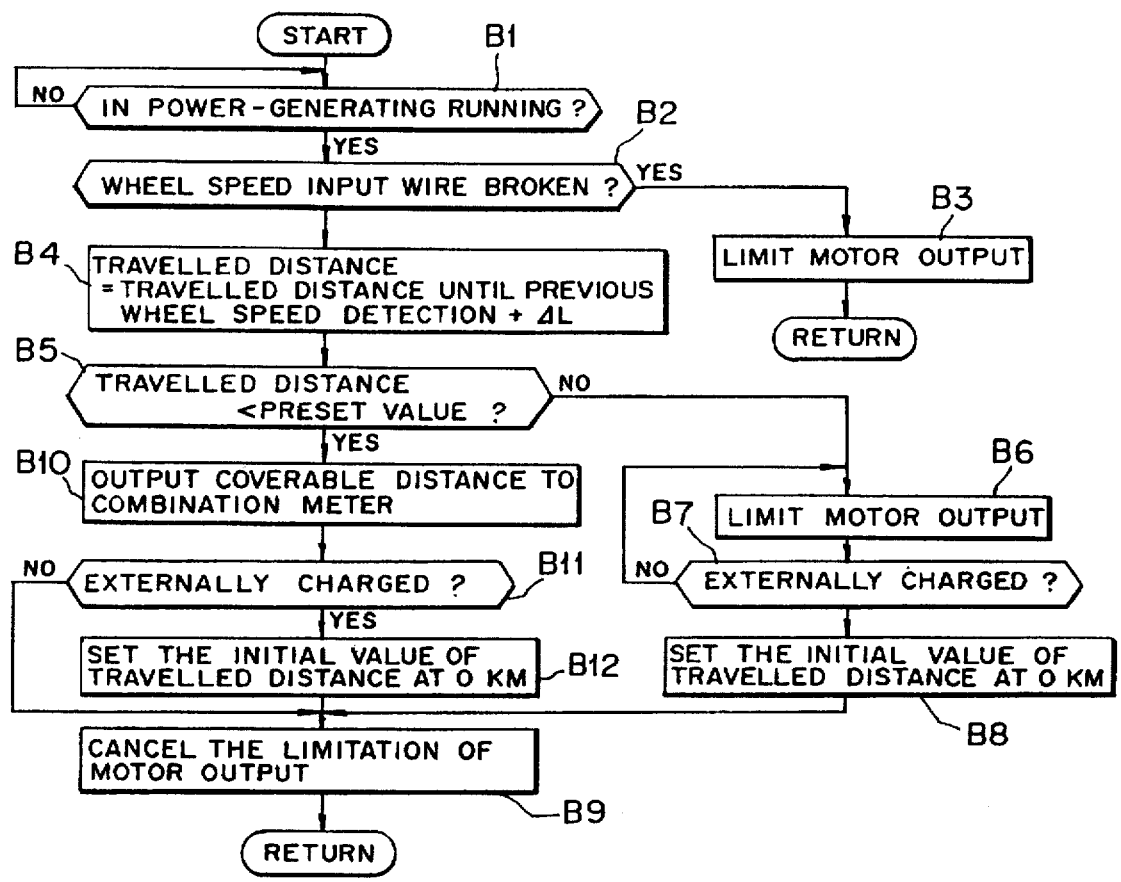
FIG. 7 is a flow chart illustrating an operation of the fuel use limiter-equipped hybrid electric car according to the second embodiment of the present invention.

Referring next to FIGS. 6 and 7, the fuel use limiter-equipped hybrid electric car according to the second embodiment of the present invention will hereinafter be described. FIG. 6 schematically illustrates the construction of its essential part. In this embodiment, the present invention has been applied to a series hybrid electric car although not shown in FIG. 6.

In FIG. 6, numeral 9 indicates a drive management controller. Designated at numeral 11 is a remaining capacity meter which detects and indicates the remaining capacity of a battery unit 11. Information on the remaining capacity of the battery unit is fed from the remaining capacity meter 11 to the drive management controller 9. Numeral 19 indicates a wheel speed sensor. Information on the wheel speed from this wheel speed sensor 19 is fed to the management controller 9.

The drive management controller 9 generally performs control of the motor controller 4, the generator 6 and the engine 7 (see FIG. 1) on the basis of information on a driver's command such as an accelerator pedal stroke and also remaining battery unit capacity information from the remaining capacity meter 11. In addition, based on detection information from the remaining capacity meter 11 and the wheel speed sensor 19, a travelled distance by power-generating running since external charging of the battery unit is calculated. When this travelled distance is determined to have exceeded a preset value determined in advance, control is performed to limit an output of an electric drive motor 2.

Described specifically, the drive management controller 9, upon control of power-generating running, determines a travelled distance while integrating detection results from the wheel speed sensor 19. These travelled distances are always integrated during power-generating running until the battery unit is externally charged. When the battery unit has been externally charged, the travelled distance is reset at 0. Whether the battery unit has been externally charged or not can be determined as in the first embodiment.

When the value of the distance travelled since external charging of the battery unit has exceeded the preset value, the drive management controller 9 limits the output of the electric drive motor 2. The drive management controller 9, however, cancels the limitation of the output of the electric drive motor 2 when the battery unit is externally charged again. In addition, the drive management controller 9 calculates a value by subtracting the travelled distance from a preset value and displays it as a coverable distance on a coverable distance indication meter 20 on the combination meter panel 14.

The fuel use limiter-equipped hybrid electric car according to the second embodiment of the present invention is also provided with wire breaking detection means 18B which detects any breaking of a signal line 19A from the wheel speed sensor 19. When breaking of the signal line 19A is determined based on detection information from the wire breaking detection means 18B, the drive management controller 9 limits the output of the electric drive motor 2 irrespective of the value of the travelled distance. When the signal line 19A is restored (i.e., connected) again by repair or the like, the drive management controller 9 then cancels the limitation of the output of the electric drive motor 2.

In the fuel use limiter-equipped hybrid electric car according to the second embodiment of the present invention, control is performed for the limitation of use of fuel, for example, as shown in FIG. 7 owing to the above-described construction.

Namely, the drive management controller 9 first determines whether the car is in power-generating running or not (step B1). The routine returns if not in power-generating running. The routine, however, advances to step B2 if in power-generating running. Based on information from the wire breaking detection means 18B, the drive management controller 9 determines whether breaking of the signal line 19A of the wheel speed sensor 19 (breaking of the wheel speed input wire) has been detected or not. If breaking of the wheel speed input wire is detected, an output of the electric drive motor 2 is limited (step B3).

If breaking of the wheel speed input wire is not detected on the other hand, a travelled distance is determined by integrating detection results from the wheel speed sensor 19 (step B4). Namely, the travelled distance is determined by adding an increment ΔL in travelled distance to a distance travelled until the previous wheel speed detection. It is then determined whether or not this travelled distance has reached a preset value determined in advance (step B5). If the travelled distance is determined to have reached the preset value, the output of the electric drive motor 2 is limited (step B6). Based on information on the remaining capacity of the battery unit from the remaining capacity mater 11, it is next determined whether or not the battery unit has been externally charged (step B7). If the battery unit is not determined to have been subjected to external charging, the limitation of the output of the electric drive motor 2 (step B6) is continued.

If the battery unit is determined to have been externally charged, the value of the travelled distance is reset to 0 (step B8). Namely, the initial value of the travelled distance is set at 0. Further, the limitation of the output of the electric drive motor 2 is canceled in step B9.

If the travelled distance is not determined to have reached the preset value, on the other hand, the routine then advances to step B10 without limiting the output of the electric drive motor 2. A value is calculated by subtracting the travelled distance from the preset value and as a coverable distance, this value is outputted to and displayed at the coverable distance indication meter 20. Based on information on the remaining capacity of the battery unit from the remaining capacity meter 11, it is determined whether the battery unit has been subjected to external charging or not (step B11). If external charging is determined to have been applied to the battery unit, the value of the travelled distance is reset to 0 as in step B8 (step B12). If the battery unit is not determined in step B11 to have been externally charged, the routine advances directly to step B9 without going through step B12. Consequently, whichever the case may be (namely, whichever route is taken from step B11), the routine advances to step B9 so that the limitation of the output of the electric drive motor 2 is canceled.

Where the routine has advanced through the route of step B11 and step B12, no output limitation has been performed in general. In this case, step B9 is not needed. Where breaking of the wheel speed input wire has been restored, an output limitation may however be performed even when the routine advances through step B11 and step B12. In this case, the limitation of the output of the electric drive motor 2 is canceled.

If the quantity of supplied fuel (strictly speaking, the quantity of consumable fuel) increases without external charging as described above, a limitation is imposed on the output of the electric drive motor 2. The driver therefore perceives an insufficient output of the car so that the driver is urged to perform external charging. Further, the display of the coverable distance gives a warning to the driver so that the driver can recognize this reduction in the output as being attributed to excessive power-generating running instead of any trouble.

As a result, the driver is motivated to drive the car without relying upon the internal combustion engine although the car is a hybrid electric car. It is, therefore, possible to fully obtain the air pollution preventing effect, which is the inherent object of the electric car, while still allowing the car to run by the internal combustion engine in the event of emergency or the like.

Further, the output of the electric drive motor 2 is also limited when the signal line is broken. Even if overuse of the internal combustion engine cannot be detected during the breaking of the signal line, it is possible to warn the breaking so that its prompt restoration (connection) can be urged. Of course, the air pollution preventing effect, the inherent object of the electric car, can be fully obtained.

Figure 8:
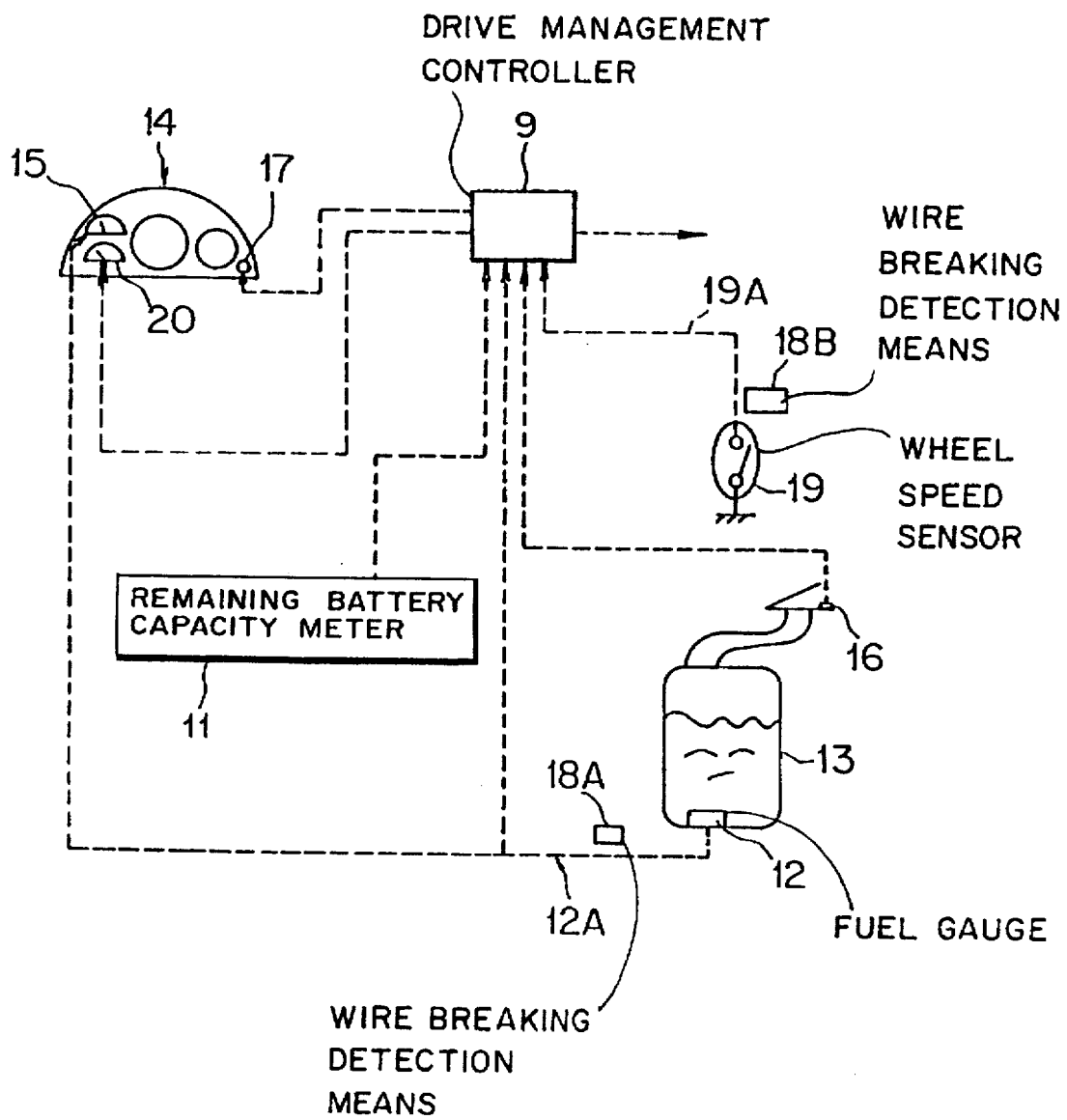
FIG. 8 is a simplified block diagram showing an essential construction of a fuel use limiter-equipped hybrid electric car according to a third embodiment of the present invention.
Figure 9:
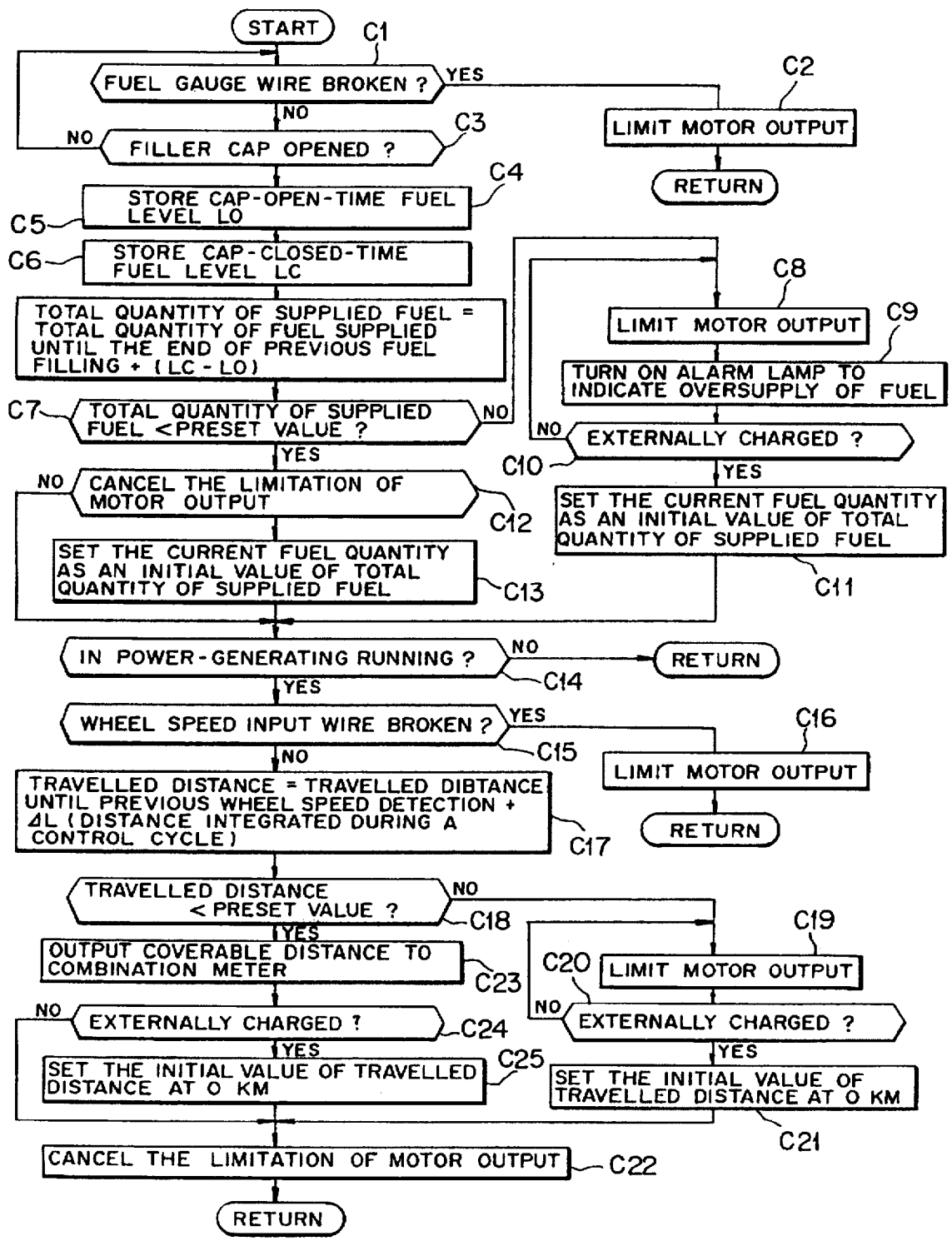
FIG. 9 is a flow chart illustrating an operation of the fuel use limiter-equipped hybrid electric car according to the third embodiment of the present invention.
Figure 10:
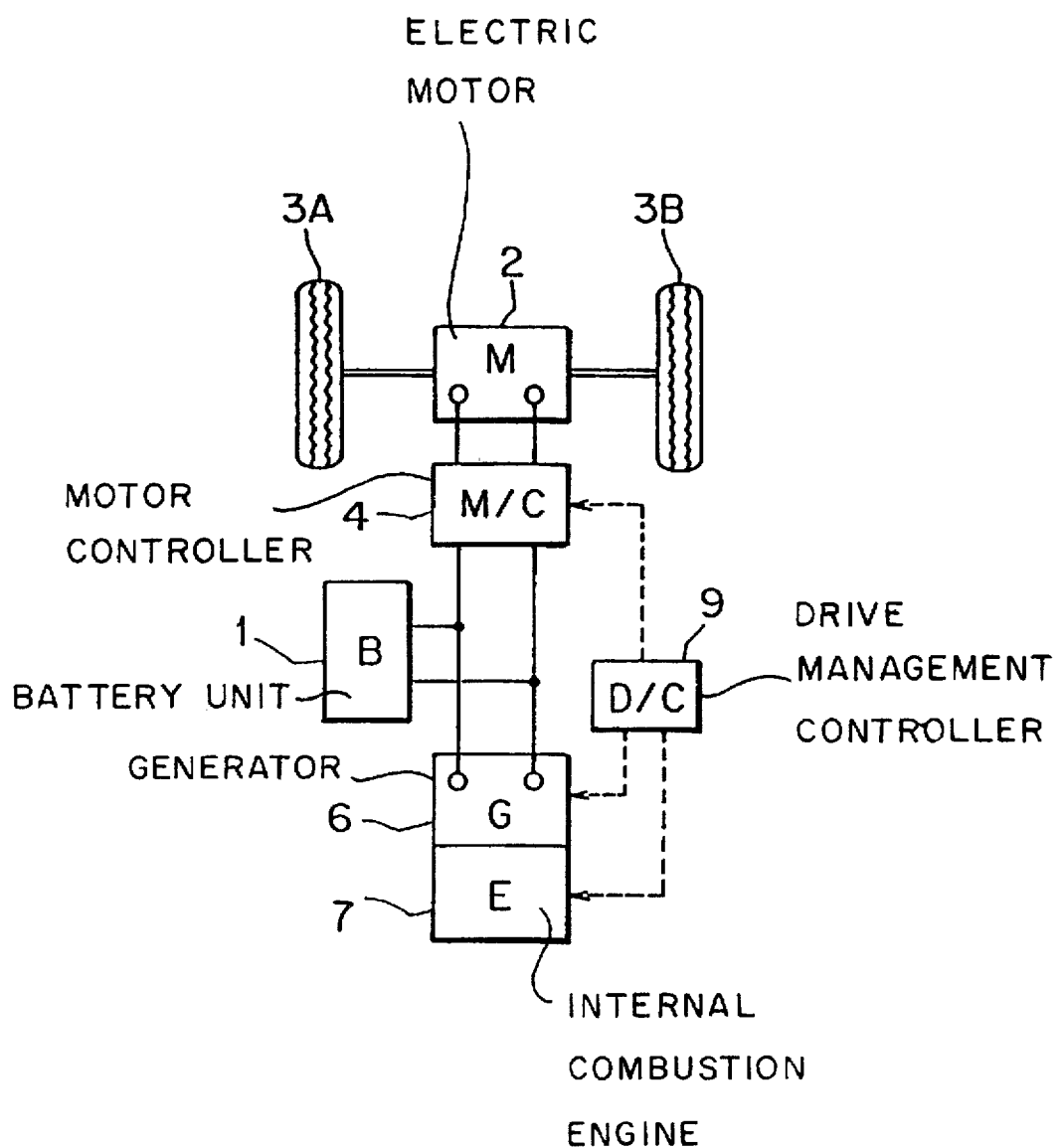
FIG. 10 is a schematic block diagram of a series hybrid electric car.

Referring next to FIGS. 8 and 9, the fuel use limiter-equipped hybrid electric car according to the third embodiment of the present invention will hereinafter be described. FIG. 8 schematically illustrates the construction of its essential part. In this embodiment, the present invention has been applied to a series hybrid electric car although not shown in FIG. 8.

This embodiment is a combination of the first embodiment and the second embodiment. In FIG. 8, like reference numerals to those shown in FIGS. 1 and 6 indicate like elements of structure. As these elements have already been described above, their description is omitted here to avoid unnecessary repetition. Based on detection information from a remaining capacity meter 11, a fuel gauge 12 and a filler cap open/close sensor 16, a drive management controller 9 in this embodiment calculates a total quantity of fuel supplied since external charging of the battery unit. When this total quantity of supplied fuel has exceeded a preset value determined in advance, a limitation is imposed on an output of an electric drive motor 2. Further, based on detection information from the remaining capacity meter 11 and the wheel speed sensor 19, the battery unit is externally charged and a distance (running distance) travelled by power-generating running subsequent to the external charging of the battery unit is calculated. When this travelled distance exceeds a preset value determined in advance, the output of the electric drive motor 2 is limited.

Namely, the drive management controller 9 limits the output of the electric drive motor 2 when the total quantity of supplied fuel (the quantity of consumable fuel) has reached the preset value without external charging of the battery unit or the travelled distance has exceeded the preset value without external charging of the battery unit.

In the fuel use limiter-equipped hybrid electric car according to the third embodiment of the present invention, control is performed for the limitation of use of fuel, for example, as shown in FIG. 9 owing to the above-described construction.

Namely, based on information from the wire breaking detection means 18A, the drive management controller 9 first determines whether breaking of the signal line 12A of the fuel gauge 12 (fuel wire gauge breaking) has been detected or not (step C1). If breaking of the fuel gauge wire is detected, an output of the electric drive motor 2 is limited (step C2).

If breaking of the fuel gauge wire is not detected on the other hand, it is determined based on information of the filler cap open/close sensor 16 whether the filler cap has been closed or not (step C3). If opening of the filler cap is detected, the total quantity of supplied fuel is calculated. Namely, a first fuel quantity LO obtained from the fuel gauge 12 when the filler cap is open is stored (step C4). Next, a second fuel quantity LC obtained from the fuel gauge 12 when the filler cap has been closed is stored (step C5). Based on these fuel quantities LO,LC, the increment in fuel quantity (=LC–LO) from the opening of the filler cap until its closure is added to a calculated value of the quantity of supplied fuel until the previous filling (i.e., the total quantity of fuel supplied until completion of the preceding filling of the fuel), whereby the total quantity of supplied fuel is calculated (step C6).

Further, it is determined whether or not this total quantity of supplied fuel has reached a preset value determined in advance (step C7). If the total quantity of supplied fuel is determined to have reached the preset value, an output of the electric drive motor 2 is limited (step C8) and an alarm lamp 17 is turned on to indicate an oversupply of fuel (step C9).

Based on information on the remaining capacity of the battery unit from the remaining capacity meter 11, it is next determined whether or not the battery unit has been externally charged (step C10). If the battery unit is not determined to have been subjected to external charging, the limitation of the output of the electric drive motor 2 (step C8) and the lighting of the alarm lamp 17 (step C9) are continued. If the battery unit is determined to have been externally charged, the value of the total quantity of supplied fuel is reset (step C11). Namely, the quantity of fuel at the time point that the external charging of the battery unit has been determined is set as an initial value of the total quantity of supplied fuel.

If the total quantity of supplied fuel is not determined to have reached the preset value, on the other hand, the routine then advances to step C12 without limiting the output of the electric drive motor 2. Based on information on the remaining capacity of the battery unit from the remaining capacity meter 11, it is determined whether the battery unit has been subjected to external charging or not. If external charging is determined to have been applied to the battery unit, the value of the total quantity of supplied fuel is reset (step C13). Namely, the quantity of fuel at the time point that the external charging of the battery unit has been determined is set as an initial value of the total quantity of supplied fuel.

It is then determined whether the car is in power-generating running or not (step C14). The routine returns if not in power-generating running. The routine, however, advances to step C15 if in power-generating running. Based on information from the wire breaking detection means 18B, it is determined whether breaking of the signal line 19A of the wheel speed sensor 19 (breaking of the wheel speed input wire) has been detected or not. If breaking of the wheel speed input wire is detected, the output of the electric drive motor 2 is limited (step C16).

If breaking of the wheel speed input wire is not detected on the other hand, a travelled distance is determined by integrating detection results from the wheel speed sensor 19 (step C17). It is then determined whether or not this travelled distance has reached a preset value determined in advance (step C18). If the travelled distance is determined to have reached the preset value, the output of the electric drive motor 2 is limited (step C19). Based on information on the remaining capacity of the battery unit from the remaining capacity meter 11, it is next determined whether or not the battery unit has been externally charged (step C20). If the battery unit is not determined to have been subjected to external charging, the limitation of the output of the electric drive motor 2 (step C20) is continued.

If the battery unit is determined to have been externally charged, the value of the travelled distance is reset to 0 (step C21). Namely, the initial value of the travelled distance is set at 0. Further, the limitation of the output of the electric drive motor 2 is canceled in step C22.

If the travelled distance is not determined to have reached the preset value, on the other hand, the routine then advances to step C23 without limiting the output of the electric drive motor 2. A value is calculated by subtracting the travelled distance from the preset value and as a coverable distance, this value is outputted to and displayed at a coverable distance indication meter 20. Based on information on the remaining capacity of the battery unit from the remaining capacity meter 11, it is determined whether the battery unit has been subjected to external charging or not (step C24). If external charging is determined to have been applied to the battery unit, the value of the travelled distance is reset to 0 as in step C21 (step C25).

If the battery unit is not determined in step C24 to have been externally charged, the routine advances directly to step C22 without going through step C25. Consequently, whichever the case may be (namely, whichever route is taken from step C24), the routine advances to step C22 so that the limitation of the output of the electric drive motor 2 is canceled.

Where the routine has advanced through the route of step C24 and step C25, no output limitation has been performed in general. In this case, step C22 is not needed. Where breaking of the fuel gauge wire has been restored, an output limitation may, however be performed even when the routine advances through step C24 and step C25. In this case, the limitation of the output of the electric drive motor 2 is canceled.

If the quantity of supplied fuel (strictly speaking, the quantity of consumable fuel) increases without external charging as described above, a limitation is imposed on the output of the electric drive motor 2. The driver therefore perceives an insufficient output of the car so that the driver is urged to perform external charging. Further, the display of the coverable distance gives a warning to the driver so that the driver can recognize this reduction in the output as being attributed to excessive power-generating running instead of any trouble. In particular, the third embodiment uses the two parameters, that is, the total quantity of supplied fuel (the amount of consumable fuel) and the travelled distance as parameters corresponding to the quantity of used fuel, so that excessive power-generating running is strictly checked.

As a result, the driver is motivated to drive the car without relying upon the internal combustion engine although the car is a hybrid electric car. It is, therefore, possible to fully obtain the air pollution preventing effect, which is the inherent object of the electric car, while still allowing the car to run by the internal combustion engine in the event of emergency or the like.

Further, the output of the electric drive motor 2 is also limited when the signal line is broken. Even if overuse of the internal combustion engine cannot be detected during the breaking of the signal line, it is possible to warn the breaking so that its prompt restoration (connection) can be urged. Of course, the air pollution preventing effect, the inherent object of the electric car, can be fully obtained.

It is to be noted that parameters corresponding to the quantity of used fuel are not limited to such total quantity of supplied fuel, travelled distance and the like. Insofar as a parameter corresponding to the quantity of used fuel, for example, the time of power-generating running, the time of operation of the internal combustion engine or the like is used, detection of a change in such a parameter makes it possible to detect the state of use of fuel so that overuse of the internal combustion engine can be detected.

The modification of the first embodiment is constructed so that the alarm lamp is turned on when the total quantity of supplied fuel has exceeded the first preset value and the output of the electric drive motor 2 is subsequently limited when the total quantity of supplied fuel has exceeded the second preset value set at a value greater than the first preset value. Similar modifications can also be practiced with respect to the second embodiment and the third embodiment.

With respect to the second embodiment, such a modification can be obtained by constructing it in such a way that the alarm lamp is lit when the travelled distance has exceeded the first set value and the output of the electric drive motor 2 is limited when the travelled distanced has exceeded the second set value set at the value greater than the first set value.

In the case of the third embodiment, such a modification can be obtained by constructing it in such a way that the alarm lamp is lit when the total quantity of supplied fuel has exceeded the first set value or the travelled distance has exceeded the first set value and the output of the electric drive motor 2 is limited when the total quantity of supplied fuel has exceeded the second set value set at the value greater than the first set value or the travelled distance has exceeded the second set value set at the value greater than the first set value.

The first to third embodiments were each applied to a series hybrid electric car. The present invention can also be applied likewise to such a parallel hybrid electric car as shown in FIG. 11 described above. Described specifically, the present invention can be applied equally to a parallel hybrid electric motor by substituting "LIMIT INTERNAL COMBUSTION OUTPUT" for "LIMIT MOTOR OUTPUT" in steps A2,A8 shown in FIG. 4 for the first embodiment, steps B3,B6 shown in FIG. 7 for the second embodiment and steps C2, C8, C16, C19 shown in FIG. 9 for the third embodiment to limit the output of the internal combustion engine 7 in each of these steps and further by substituting "CANCEL THE LIMITATION OF INTERNAL COMBUSTION ENGINE OUTPUT" for "CANCEL THE LIMITATION OF MOTOR OUTPUT" in step A12 shown in FIG. 4 for the first embodiment, step B9 shown in FIG. 7 for the second embodiment and steps C12 and C22 shown in FIG. 9 for the third embodiment to cancel the limitation of the output of the internal combustion engine 7.

Urge of external charging to a driver by performing such an output limitation of the internal combustion engine 7 can also be practiced in series hybrid electric cars. Further, series hybrid electric cars can each be constructed to urge external charging by limiting outputs of both the motor 2 and the internal combustion engine 7.

It is, however preferred to construct a series hybrid electric motor to limit the output of the motor 2 because the limitation of the output of the motor 2 makes it possible to drive the series hybrid electric motor while maintaining the internal combustion engine 7 in an operation range where both gas mileage and exhaust gas are optimal.

What is claimed is:

1. A fuel use limiter-equipped hybrid electric car having a battery unit chargeable by external charging means, an electric drive motor for driving wheels by electric power from said battery unit, an internal combustion engine for driving a generator to supply electric power to said electric drive motor, and control means for controlling operations of said electric drive motor and said internal combustion engine, comprising:

fuel-use-state detection means for detecting a change in a parameter, said change corresponding to a quantity of fuel which has been used by said internal combustion engine since charging of said battery unit by said external charging means, wherein said control means limits at least one of an output of said electric drive motor and an output of said internal combustion engine when from results of a detection by said fuel-use-state detection means, said change in said parameter reaches a predetermined value.

2. A fuel use limiter-equipped hybrid electric car according to claim 1, wherein a quantity of supplied fuel is used as said parameter, said fuel-use-state detection means includes supplied-fuel-quantity detection means for detecting a total quantity of fuel supplied after said charging of said battery unit by said external charging means, and said control means limits the output of said electric drive motor when from the results of detection by said fuel-use-state detection means, said total quantity of supplied fuel reaches a predetermined value.

3. A fuel use limiter-equipped hybrid electric car according to claim 2, further comprising:

fuel quantity detection means for detecting a quantity of fuel in a fuel tank, wherein said supplied-fuel-quantity detection means detects the total quantity of the supplied fuel on the basis of detection information from said fuel quantity detection means.

4. A fuel use limiter-equipped hybrid electric car according to claim 2, wherein said supplied-fuel-quantity detection means calculates the total quantity of the supplied fuel by using, as an initial value of the total quantity of supplied fuel, a quantity of fuel immediately after charging of said battery unit by said external charging means and then adding a quantity of fuel supplied at each fuel filling.

5. A fuel use limiter-equipped hybrid electric car according to claim 3, further comprising:

filler cap open/close detection means for detecting an opened or closed state of a filler cap, wherein said supplied-fuel-quantity detection means calculates the quantity of fuel supplied at each fuel filling from a quantity of fuel in said fuel tank detected upon opening of said filler cap and another quantity of fuel in said fuel tank detected upon subsequent closure of the filler cap on the basis of detection information from said filler cap open/close detection means and detection information from said fuel quantity detection means.

6. A fuel use limiter-equipped hybrid electric car according to claim 3, further comprising:

means for detecting a trouble of a path through which detection results are transmitted from said fuel quantity detection means to said supplied-fuel-quantity detection means, wherein said control means limits the output of said electric drive motor upon detection of a trouble by said trouble detection means irrespective of results of a detection by said supplied-fuel-quantity detection means.

7. A fuel use limiter-equipped hybrid electric car according to claim 1, further comprising:

fuel quantity detection means for detecting a quantity of fuel in said fuel tank, wherein the quantity of fuel in said fuel tank is used as the parameter, said fuel-use-state detection means includes consumed-fuel-quantity detection means for detecting on the basis of detection information from said fuel quantity detection means a total quantity of fuel consumed after charging of said battery unit by said external charging means, and said control means limits an output of said electric drive motor when from results of a detection by said consumed-fuel-quantity detection means, the total quantity of consumed fuel reaches a predetermined value.

8. A fuel use limiter-equipped hybrid electric car according to claim 7, wherein said consumed-fuel-quantity detection means calculates the total quantity of consumed fuel by subtracting a quantity of fuel after each running of said car from a quantity of fuel before the running to determine the quantity of fuel consumed during the running and summing quantities of fuel consumed during individual runnings.

9. A fuel use limiter-equipped hybrid electric car according to claim 7, further comprising:

trouble detection means for detecting a trouble of a path through which detection results are transmitted from said fuel quantity detection means to said supplied-fuel-quantity detection means, wherein said control means limits an output of said electric drive motor upon detection of a trouble by said trouble detection means irrespective of results of a detection by said supplied-fuel-quantity detection means.

10. A fuel use limiter-equipped hybrid electric car according to claim 1, wherein a travelled distance of said car while using said internal combustion engine is used as the parameter, said fuel-use-state detection means includes travelled distance detection means for detecting a total distance travelled during the use of said internal combustion engine after charging of said battery unit by said external charging means, and said control means limits the output of said electric drive motor when from results of a detection by said travelled distance detection means, the total distance travelled during the use of said internal combustion engine reaches a predetermined value.

11. A fuel use limiter-equipped hybrid electric car according to claim 10, wherein said travelled distance detection means detects the total travelled distance during the use of said internal combustion engine on the basis of information on use of said internal combustion engine and detection information from wheel speed detection means which said car is equipped with.

12. A fuel use limiter-equipped hybrid electric car according to claim 11, further comprising:
trouble detection means for detecting a trouble of a path through which detection results are transmitted from said wheel speed detection means to said travelled distance detection means, wherein
said control means limits an output of said electric drive motor upon detection of a trouble by said trouble detection means irrespective of results of a detection by said wheel speed detection means.

13. A fuel use limiter-equipped hybrid electric car according to claim 1, wherein a quantity of supplied fuel or a travelled distance of said car while using said internal combustion engine is used as the parameter, said fuel-use-state detection means includes supplied-fuel-quantity detection means for detecting a total quantity of fuel supplied after said charging of said battery unit by said external charging means and travelled distance detection means for detecting a total distance travelled during said using of said internal combustion engine after charging of said battery unit by said external charging means, and said control means limits an output of said electric drive motor when from results of a detection by said supplied-fuel-quantity detection means, said total quantity of fuel supplied after said charging of said battery unit by said external charging means reaches a predetermined value or when from results of a detection by said travelled distance detection means, said total distance travelled during said using of said internal combustion engine reaches another predetermined value.

14. A fuel use limiter-equipped hybrid electric car according to claim 1, wherein an operation time of said internal combustion engine is used as the parameter, said fuel-use-state detection means includes operation time detection means for detecting an operation time of said internal combustion engine after charging of said battery unit by said external charging means, and said control means limits the output of said electric drive motor when from results of a detection by said operation time detection means, the operation time of said internal combustion engine reaches a predetermined value.

15. A fuel use limiter-equipped hybrid electric car according to claim 14, wherein said operation time detection means detects the operation time of said internal combustion engine by a timer on the basis of information on use of said internal combustion engine.

16. A fuel use limiter-equipped hybrid electric car according to claim 1, further comprising:
warning means which is actuated when from results of a detection by said fuel-use-state detection means, said change in said parameter reaches a predetermined value.

17. A fuel use limiter-equipped hybrid electric car according to claim 16, wherein the predetermined value of the change of the parameter, at which predetermined value said warning means is actuated, is set smaller than another predetermined value of the change of the parameter at said another predetermined value the output of said electric drive motor is limited.

18. A fuel use limiter-equipped hybrid electric car according to claim 1, wherein said control means limits the output of said electric drive motor when the change in the parameter reaches the predetermined value.

19. A fuel use limiter-equipped hybrid electric car according to claim 18, wherein said control means operates said internal combustion engine in an operation region in which gas mileage and exhaust gas are optimal.

20. A fuel use limiter-equipped hybrid electric car according to claim 18, wherein said control means limits the output of said electric drive motor by limiting a maximum torque of said electric drive motor.

21. A fuel use limiter-equipped hybrid electric car according to claim 1, wherein said control means limits the output of said electric drive motor by gradually reducing a torque of said electric drive motor when a rotational speed of said electric drive motor reaches a predetermined value.

22. A fuel use limiter-equipped hybrid electric car having a battery unit chargeable by external charging means, an electric drive motor for driving wheels by electric power from said battery unit, an internal combustion engine for driving said wheels, and control means for controlling operations of said electric drive motor and said internal combustion engine, comprising:
fuel-use-state detection means for detecting a change in a parameter, said change corresponding to a quantity of fuel which has been used by said internal combustion engine since charging of said battery unit by said external charging means,
wherein said control means limits at least one of an output of said electric drive motor and an output of said internal combustion engine when from results of a detection by said fuel-use-state detections means, said change in said parameter reaches a predetermined value.

23. A fuel use limiter-equipped hybrid electric car according to claim 22, further comprising:
fuel quantity detection means for detecting a quantity of fuel in said fuel tank, wherein
the quantity of fuel in said fuel tank is used as the parameter, said fuel-use-state detection means includes consumed-fuel-quantity detection means for detecting on the basis of detection information from said fuel quantity detection means a total quantity of fuel consumed after charging of said battery unit by said external charging means, and said control means limits said output of at least one of said electric drive motor and said internal combustion engine when from results of a detection by said consumed fuel reaches a predetermined value.

24. A fuel use limiter-equipped hybrid electric car according to claim 22, wherein a quantity of supplied fuel is used as said parameter, said fuel-use-state detection means includes supplied-fuel-quantity detection means for detecting a total quantity of fuel supplied after said charging of said battery unit by said external charging means, and said control means limits said output of at least one of said electric drive motor and said internal combustion engine when from results of said detection by said fuel-use-state detection means, said total quantity of supplied fuel reaches a predetermined value.

25. A fuel use limiter-equipped hybrid electric car according to claim 22, wherein a travelled distance of said car while using said internal combustion engine is used as the parameter, said fuel-use-state detection means includes travelled distance detection means for detecting a total distance travelled during said using of said internal combustion engine after charging of said battery unit by said external charging means, and said control means limits said output of at least one of said electric drive motor and said internal combustion engine when from results of a detection by said travelled distance detection means, the total distance travelled during said using of said internal combustion engine reaches a predetermined value.

26. A fuel use limiter-equipped hybrid electric car according to claim 22, wherein a operation time of said internal combustion engine is used as the parameter, said fuel-use-state detection means includes operation time detection means for detecting an operation time of said internal combustion engine after charging of said battery unit by said external charging means, and said control means limits said output of at least one of said electric drive motor and said internal combustion engine when from results of a detection by said operation time detection means, the operation time of said internal combustion engine reaches a predetermined value.

27. An output control method for a hybrid electric vehicle having a rechargeable battery unit rechargeable by an external charging unit, an electric motor which drives vehicle wheels by obtaining electrical power from said battery unit, an internal combustion engine which drives a generator to recharge said battery unit, and a controller which controls operations of said electric motor and said internal combustion engine, comprising:

detecting a change in a parameter corresponding to an amount of fuel which has been used by said internal combustion engine after said battery unit was recharged by said external charging unit; and limiting an output of at least one of said electric motor and said internal combustion engine when said change in said parameter reaches a predetermined value.

28. An output control method for a hybrid electric car having a battery unit chargeable by external charging unit, an electric drive motor which drives vehicle wheels by obtaining electrical power from said battery unit, an internal combustion engine which drives said vehicle wheels, and a controller which controls operations of said electric drive motor and said internal combustion engine, comprising:

detecting a change in a parameter corresponding to an amount of fuel which has been used by said internal combustion engine after said battery unit was recharged by said external charging unit; and limiting an output of at least one of said electric drive motor and said internal combustion engine when said change in said parameter reaches a predetermined value.

* * * * *